United States Patent [19]

Nakagaki

[11] Patent Number: 5,061,339
[45] Date of Patent: Oct. 29, 1991

[54] MOLDING MACHINE FOR RUBBER BELT PRODUCTION

[75] Inventor: Toshio Nakagaki, Kobe, Japan

[73] Assignee: Bando Kagaku Kabushiki Kaisha, Kobe, Japan

[21] Appl. No.: 592,843

[22] Filed: Oct. 4, 1990

[30] Foreign Application Priority Data

Oct. 31, 1989 [JP] Japan .................. 01-285483

[51] Int. Cl.$^5$ .......................................... B65H 81/00
[52] U.S. Cl. ................................... 156/446; 156/396;
156/414; 156/459; 425/340; 425/363; 425/457
[58] Field of Search ................. 164/DIG. 3, 286, 289,
164/290; 264/311; 425/425, 430, 434, 340,
342.1, 363, 383, 457; 156/394.1, 396, 397, 414,
446, 459

[56] References Cited

U.S. PATENT DOCUMENTS

| | | | |
|---|---|---|---|
| 1,341,670 | 1/1920 | Powell | 425/430 |
| 2,442,550 | 6/1948 | Rubissow | 425/425 |
| 2,624,072 | 1/1953 | Delacoste et al. | 425/425 |
| 2,961,703 | 11/1960 | Pinotti | 425/430 |
| 3,756,882 | 9/1973 | Vila | 156/396 |
| 3,771,928 | 11/1973 | Gostn et al. | 425/425 |
| 3,791,897 | 12/1974 | Mesly | 156/396 |
| 3,850,368 | 11/1974 | Boeckler | 425/430 |
| 3,909,337 | 9/1975 | Yabe | 156/396 |
| 4,034,955 | 7/1977 | Wallace | 425/425 |
| 4,130,158 | 12/1978 | Kulig et al. | 264/311 |
| 4,134,783 | 1/1979 | Appleby et al. | 156/396 |
| 4,148,677 | 4/1979 | Bellamy et al. | 156/446 |
| 4,197,155 | 4/1980 | Hursell | 156/396 |
| 4,268,330 | 5/1981 | Komatsu et al. | 156/396 |

Primary Examiner—Willard Hoag
Attorney, Agent, or Firm—Marshall, O'Toole, Gerstein, Murray & Bicknell

[57] ABSTRACT

A molding machine for rubber belt production that is used in the production of rubber belts mainly for power transmission, to wind canvas, cords, rubber sheet, etc. around a mold. In the molding machine, a plurality of supporting machines each capable of supporting a mold disconnectably and rotatably around the central axis of the mold are mounted on a horizontally rotatable rotary table at a fixed radial distance from the center of rotation of the table. Each supporting machine is arranged to be capable of tilting a mold between a position wherein the central axis of the mold is lateral and a position wherein the central axis is vertical. This molding machine is capable of executing molding on one mold supported by one supporting machine while exchanging a mold of another supporting machine of which molding is completed with a new mold.

2 Claims, 4 Drawing Sheets

MOLDING MACHINE FOR RUBBER BELT PRODUCTION

FIELD AND BACKGROUND OF THE INVENTION

This invention relates to a molding machine that is used in the production of rubber belts mainly used in power transmission.

Rubber belts of this kind are produced by vulcanizing an unvulcanized rubber portion of a molding in a vulcanizer. A belt includes canvas as the structural member, cords as the tensile element, and an initially unvulcanized rubber sheet which is wound around a mold by a molding machine. The entire assembly is placed in a vulcanizer wherein the assembly is pressurized and heated by high pressure steam to effect crosslinking of the rubber. Then the cross-linked molding together with the mold is removed from the vulcanizer. The mold is separated from the molding, and the molding is cut crosswise into rings of a desired width to produce rubber belts, the final product.

In a conventional typical molding machine, as illustrated in FIG. 4, one end of the core of a mold A is inserted onto the rotary drive shaft 21a of the main spindle head 21, and the other end of the mold A is supported by the tailstock 22. Canvas and cords are would in turn over the mold A by turning the rotary drive shaft 21a, and then an unvulcanized rubber sheet that has been reduced to the desired thickness by a calender roller or the like is wound in multiple layers.

As illustrated in FIG. 5, another molding machine is also known, wherein molds A and B are supported by the respective horizontal shafts 26 of a turret 25 which is rotatable in a horizontal plane on a vertical axis, the turret having a pair of oppositely extending horizontal shafts 26. One end of the mold A is inserted in the rotary drive shaft 21a of the main spindle head 21 to carry out the winding of the canvas, cords, etc. while the other mold B is transferred by a handling machine 27 arranged to be movable close to and away from the turret 25, in order to exchange molds.

Of the aforementioned conventional molding machines, the former needs, when exchanging a mold, to move the mold A held in a horizontal position (laterally) between the main spindle head 21 and the tailstock 22 to a perpendicular position (vertically) and lift the mold A by means of a lifting accessory. A mold after molding can be inserted into a vulcanizer to achieve vulcanization, the next process, only after the central axis of the mold is positioned vertically. Hence the direction (position) of the mold A of which the central axis is horizontal during molding needs to be changed so that the central axis lies vertically. As a result, the exchange of molds is very dangerous, and requires much experience and time, and the work efficiency is also poor since the exchange is made by halting the production line.

In the case of the latter, there is no need to halt the production line since assembly of the molding parts can be made on one mold A while exchange of the other mold B is made simultaneously. Moreover, as the latter is provided with the handling machine 27, there is no need to change the direction of a mold to a vertical position when the mold is to be lifted with the lifting accessory. However, since both of the two molds A and B are supported horizontally relative to the turret 25, the space needed for rotation of the turret 25 to change the left-hand and right-hand positions of the molds A and B with each other is fairly large. Furthermore, a space for installing the handling machine 27, and a space for the handling machine 27 to move towards or away from the turret 25 are also needed. Hence the installation space of the whole installation is very large. Because the operating radius of the installation increases with the installation space, the work efficiency is poor.

SUMMARY OF THE INVENTION

The present invention was made with a view to obviating the aforementioned problems, and its objective is to provide a molding machine for rubber belt production that has a simple structure, can be made relatively compact, requires a smaller installation space and a shorter operating radius, allows easy exchange of the molds without halting the production line, and has a high working efficiency.

To achieve the aforementioned objective, a molding machine for rubber belt production according to the present invention is arranged as follows: In a molding machine for rubber belt production that molds canvas, cords, rubber sheets, etc. by winding them over molds, a plurality of supporting machines being capable of supporting said molds disconnectably and rotatably around the central axis thereof are arranged on a rotary table which is capable of horizontal turning in positions at a constant distance in the radial direction from the center of rotation of the table, and the supporting machines are capable of tilting the central axis of each mold between the lateral position and the vertical position.

In a molding operation the rotary table is provided with a plurality of mold supporting machines opposite to a main spindle head that is capable of holding one mold on one end thereof and driving the mold in rotation, holding the mold supported by one supporting machine with the central axis of the mold set horizontal between the rotary table and the main spindle head, rotating the mold around the central axis thereof, and winding canvas, cords, unvulcanized rubber sheet, etc. over the circumference of the mold. At the same time, a mold being supported by another supporting machine and of which the molding is completed is set in a vertical position, and then is lifted up by a lifting accessory to be transferred to the next process. Furthermore, a supporting machine that has discharged a mold is made to hold a new mold lifted by a lifting accessory, etc. with the central axis of the mold set in a vertical position, to execute exchange of molds. When a lateral mold over which molding is completed on the main spindle head is to be replaced by a new mold, the lateral mold is raised by the supporting machine to a vertical position and then the rotary table is turned. As a result, relative to the conventional molding machines, the space required for rotating a plurality of molds is reduced. If each mold is raised fully to the perpendicular position, the rotation space will be reduced to the minimum.

In a preferred embodiment, a pair of opposed supporting stands are mounted on the rotary table across the center of the rotary table, to rotatably support the supporting machines for the molds, by means of a horizontal support shaft on each supporting stand. A linkage member is connected to each support shaft to rotatably connect a connecting linkage member to the respective ends of the linkage members in such a way that when one mold held by one supporting machine is lateral, the mold held by the other supporting machine is vertical. The connecting linkage member is provided with a single cylinder to reciprocate the connecting linkage member in the axial direction thereof. The extension or the contraction of the single cylinder gradually raises one mold held by one supporting machine from the horizontal position wherein the central axis of the mold is lateral to the perpendicular position wherein the central axis of the mold is vertical, and at the same time, gradually tilts the mold held by the other supporting machine from the perpendicular position to the horizontal position. Accordingly, when the rotary table is to be turned to exchange the positions of the molds, the rotation is made with the respective central axes of both the molds tilted at 45 degrees to execute molds exchange within a smaller space of rotation.

BRIEF DESCRIPTION OF THE DRAWINGS

The invention will be better understood from the following detailed description taken in conjunction with the drawings wherein.

DETAILED DESCRIPTION OF THE INVENTION

Figure 1:
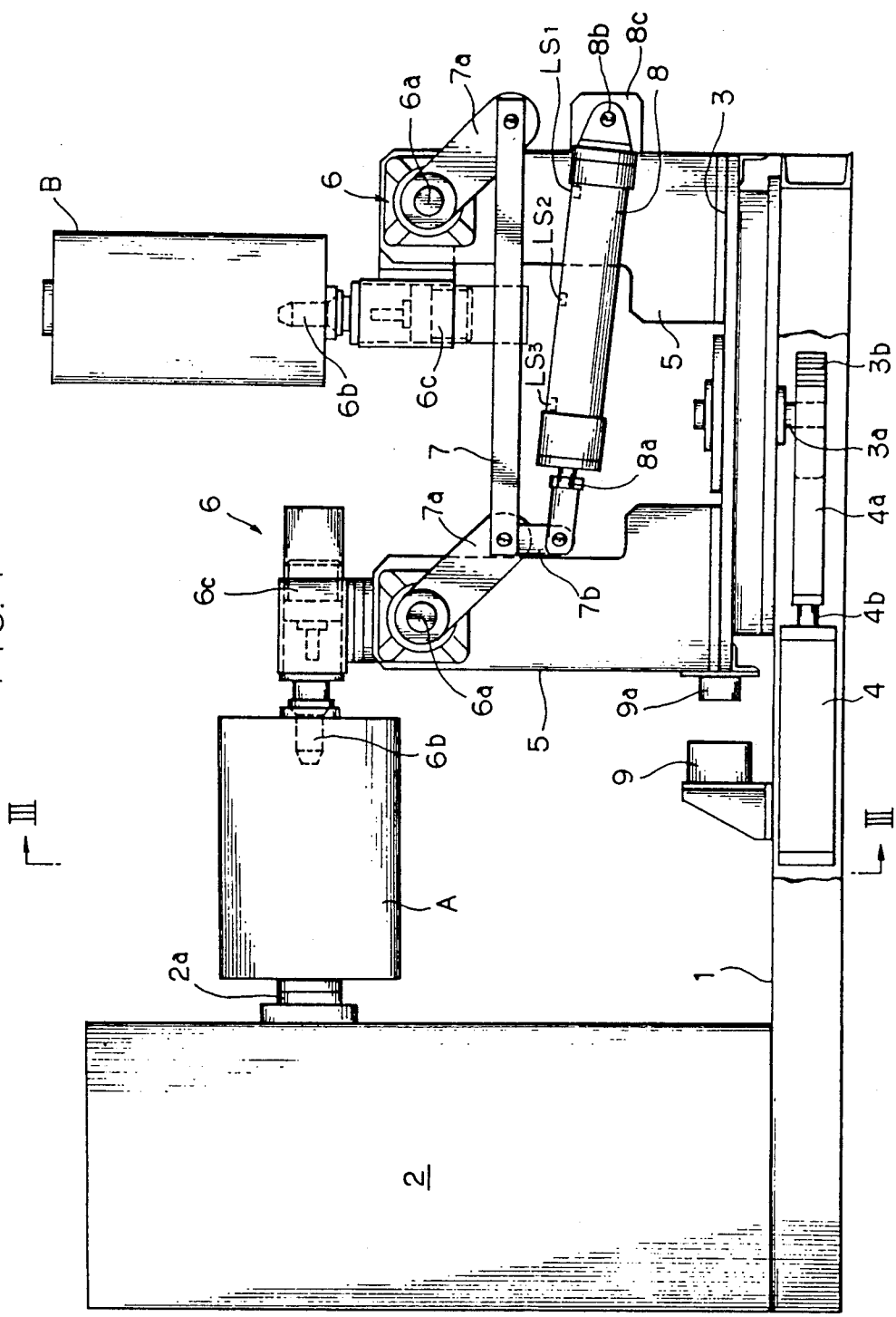
FIG. 1 is a front elevational view showing a preferred embodiment of the molding machine for rubber belt production according to the present invention.
Figure 2:
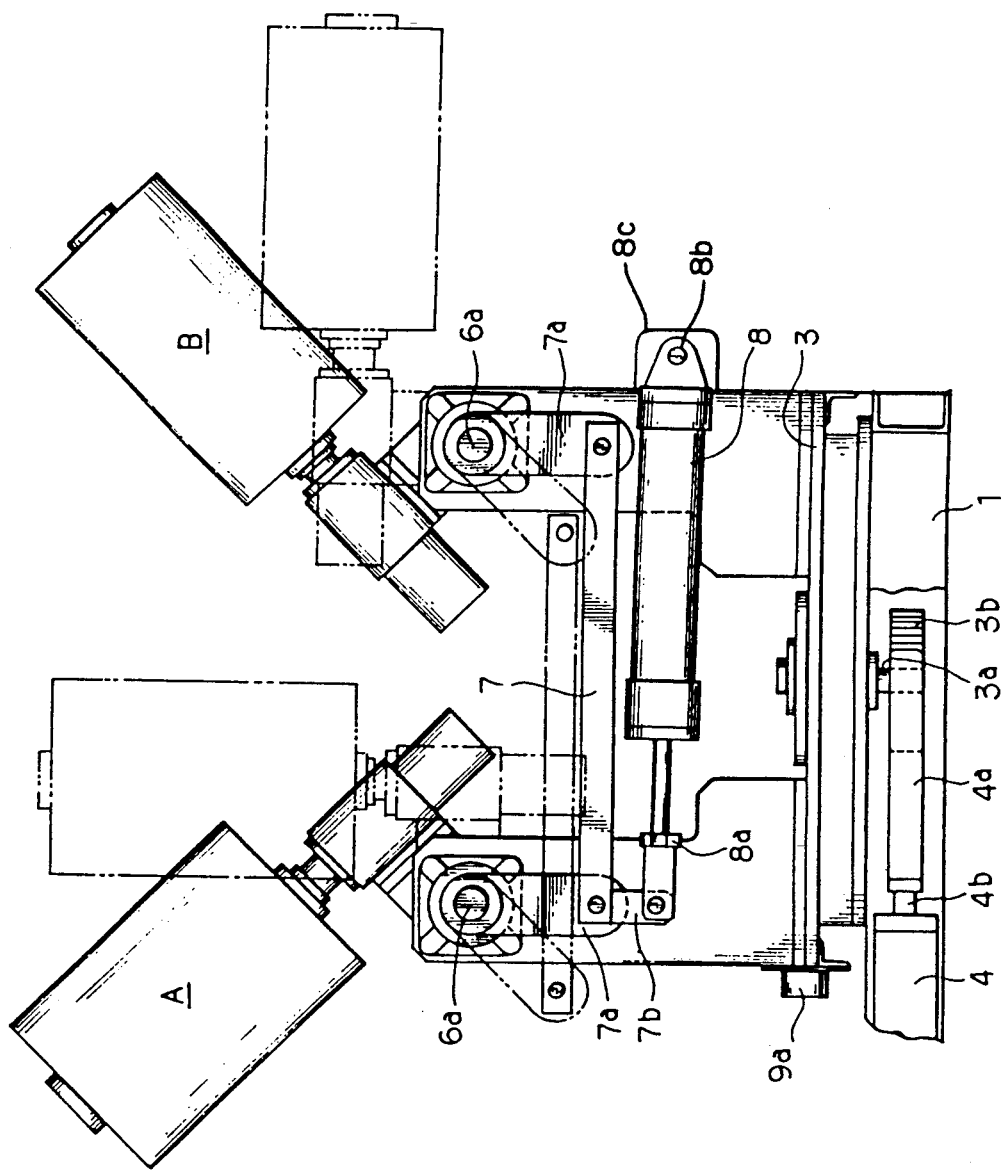
FIG. 2 is a front view showing the molding machine of FIG. 1, with both the molds rotated by 45 degrees.
Figure 3:
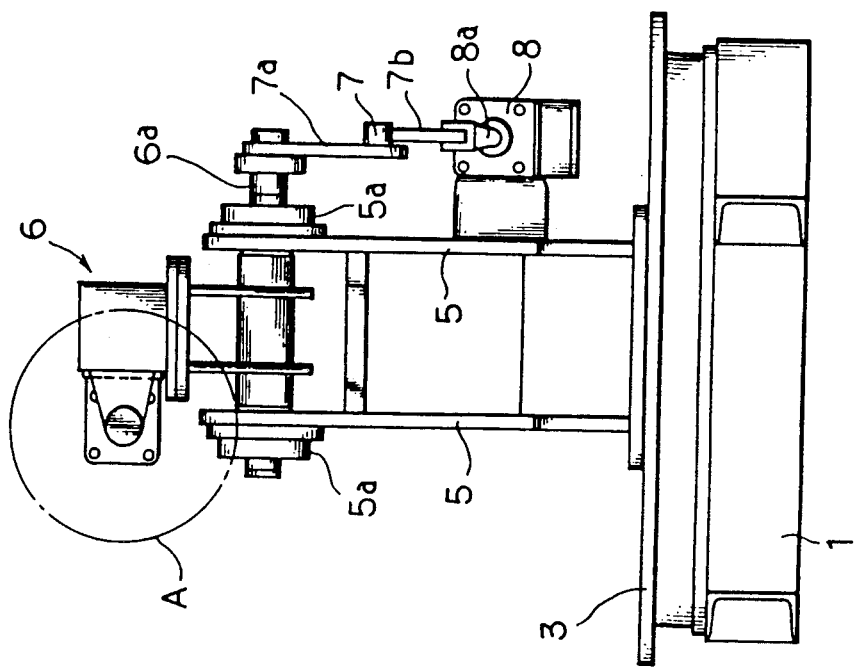
FIG. 3 is a view along the line III—III of FIG. 1.
Figure 4:
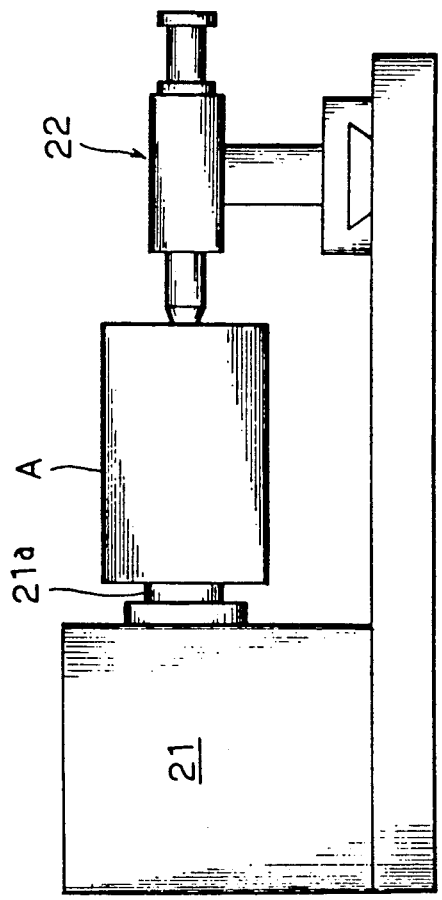
FIG. 4 is a front view showing a conventional molding machine.
Figure 5:
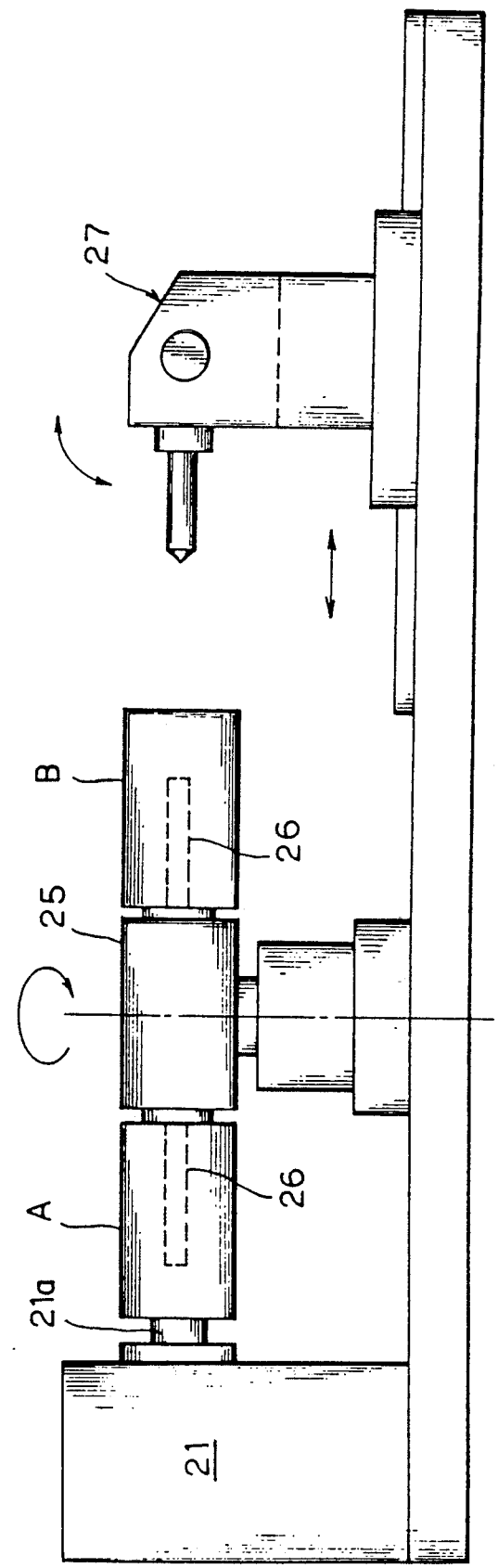
FIG. 5 is a front view showing another conventional molding machine

With reference to FIG. 1 through FIG. 3, an embodiment of the molding machine for rubber belt production according to the present invention is described as follows.

As illustrated in FIG. 1, on one side (the left-hand side as seen in FIG. 1 of the drawing) of a base 1, a main spindle head 2 is mounted for driving a mold A (and a mold B) in rotation. The main spindle head 2 is of a known type, and is provided with a rotary drive shaft 2a protruding sideways on a horizontal axis. This rotary drive shaft 2a is inserted into or pressed against one end of the core of the mold A in order to rotate the mold A.

A rotary table 3 is rotatably mounted on the base 1 at the end opposite to the main spindle head 2. A vertical rotary shaft 3a which integrally turns with the rotary table 3, is provided with a pinion gear 3b on its lower end. A rack 4a engages with the pinion gear 3b and is fixed to a cylinder rod 4b of a hydraulic cylinder 4 for movement on a horizontal axis to rotate the gear 3b. The hydraulic cylinder 4 is mounted in the base 1, and the rotary table 3 is rotated one-half cycle (180 degrees) clockwise or counterclockwise by the extension or the contraction, respectively, of the hydraulic cylinder rod 4b.

On the rotary table 3, two pairs of vertical support frames 5 are mounted opposingly on opposite sides of the center of rotation thereof at the same distance. On the top end of each pair of support frames 5 is rotatably mounted a supporting machine 6 for the mold A (and a second identical mold B) as shown in FIG. 3. A horizontal support shaft 6a extends laterally across the frames 5 and is supported by bearings 5a. The supporting machines 6 on opposite sides are opposed to each other (see FIGS. 1 and 2), and on the upper end of each supporting machine 6 is provided a protruding support member or pin 6b for disconnectably supporting one end of the core of the mold A (and the mold B). The support member 6b is arranged to be moved outwardly to protrude further by a pneumatic cylinder 6c mounted inside each supporting machine 6. The support member 6b is actuated to protrude further when molding is executed in order to hold the lateral mold A between the rotary drive shaft 2a of the main spindle head and the support member 6b, as shown in FIG. 1.

With reference to FIGS. 1 and 3, on one end of each of the support shafts 6a, one end of a linkage member 7a of the same length is fixed, and the two ends of a connecting link 7 are pivotally mounted on the outer ends of the linkage members 7a. A kind of parallel linkage is thus formed by the two linkage members 7a and the connecting link 7 as shown in FIGS. 1 and 2, and the pair of supporting machines 6 are rotated simultaneously, via the support shafts 6a, by shifting the connecting link 7 in the axial or horizontal direction thereof. The directions of the pair of supporting machines 6 (the directions of the support shafts 6a to be more exact) are arranged in such a way that when one support machine 6 is lateral (the pin 6b is in the horizontal position), the direction of the other supporting machine 6 (the direction of the shaft 6a to be exact) is vertical (the pin 6b is in the perpendicular position) as shown in FIG. 1.

In the present embodiment, a hydraulic cylinder 8 is used as the rotary drive unit for the supporting machines 6. The root end or base of the hydraulic cylinder 8 is pivotally connected by a pin 8b to a support member 8c extruding outwards from the side of one support frame 5 (in the right-hand side of FIG. 1), and the outer end of the cylinder rod 8a of the hydraulic cylinder 8 is pivotally connected to a support member 7b protruding downwards from one side (the left-hand side of FIG. 1) of a connecting link 7 which is pivotably connected to the outer ends of the members 7a. When the hydraulic cylinder 8 is gradually extended from the most contracted state shown in FIG. 1, as illustrated in FIG. 2, the supporting machine 6 on the left-hand side of the drawing will be turned clockwise from a horizontal position wherein the mold (the central axis of the mold to be exact, hereinafter referred to as just the mold) thereof is lateral to a position wherein the mold is tilted at 45 degrees, and then to a position wherein the mold is vertically upright (shown by the dash-dot-dot lines), and at the same time, the supporting machine 6 on the right-hand side of the drawing will be turned clockwise from a position wherein the mold thereof is vertical, to a position wherein the mold is tilted at 45 degrees, and then to a position wherein the mold is lateral.

In the hydraulic cylinder 8, three limit switches $LS_1$, $LS_2$ and $LS_3$ are provided to detect the position of the piston (not illustrated) of the cylinder rod 8a. The first limit switch $LS_1$ detects the most contracted position of the piston, the position wherein the mold supported by the supporting machine 6 on the left-hand side of the drawing is lateral and the mold supported by the supporting machine 6 on the right-hand side of the drawing is vertical. The second limit switch $LS_2$ detects the intermediate position of the hydraulic cylinder 8, the position wherein the molds supported by the respective right-hand and left-hand supporting machines 6 are tilted at 45 degrees. The third limit switch $LS_3$ detects the most extended position of the hydraulic cylinder 8, the position wherein the mold supported by the supporting machine 6 on the left-hand side of the drawing is vertical, and the mold supported by the supporting machine 6 on the right-hand side of drawing is lateral.

The numeral 9 in FIG. 1 denotes a hydraulic cylinder typed stopper device for fixing the rotary table 3 in a predetermined position. A counterpart 9a with which the stopper device 9 is engaged is provided on each side of the rotary table 3.

Next, the operation of the molding machine of the aforementioned embodiment is described as follows:

As shown in FIG. 1, the lateral mold A supported by the supporting machine 6 on the left-hand side is supported between the rotary drive shaft 2a of the main spindle head 2 and the supporting machine 6 by protruding the support member 6b forward by the action of the pneumatic cylinder 6c. Then to execute molding, the mold A is rotated by turning the rotary drive shaft 2a to wind canvas, cords and unvulcanized rubber sheet (not shown) as structural members of the rubber belt in turn around the circumference of the mold A.

At the same time as the above winding process, the mold vertically supported by the supporting machine 6 on the right-hand side (of which molding has been completed) is lifted by a lifting accessory, (a hoist, etc.) to transfer the mold B to a vulcanizer (not illustrated) for the next process which is vulcanization. Then another replacement mold B is lifted by the lifting accessory to replace the mold B on the supporting machine 6 on the right-hand side from which the previous mold has been discharged.

When the molding over the mold A is completed, the support member 6b of the supporting machine 6 is withdrawn by the pneumatic cylinder 6c to move both the pin 6b and the mold A toward the right and to remove the mold A from the rotary drive shaft 2a of the main spindle head 2. Next, the cylinder rod 8a of the hydraulic cylinder 8 is extended to the intermediate position to tilt, as shown in solid lines in FIG. 2, the molds B and A supported by the supporting machines 6 on the right-hand and left-hand sides at an inclination of about 45 degrees relative to the perpendicular direction. Then the rotary table 3 is turned on the vertical shaft 3a by 180 degrees by the hydraulic cylinder 4 to exchange the positions of the mold A on the left-hand side and the mold B on the right-hand side with each other, together with their respective supporting machines 6.

The cylinder rod 8a of the hydraulic cylinder 8 is then extended to the most extended position to tilt, as illustrated in FIG. 2, the mold B supported by the supporting machine 6, which is now on the left-hand side, from the position of inclination of 45 degrees to a lateral position (indicated by imaginary line), and at the same time, to raise the mold A, which is now on the right-hand side, supported by the supporting machine 6 on the right-hand side to a vertical position (indicated by imaginary line). The cylinder 6c associated with the mold B is then extended to connect the mold B with the shaft 2a. Then with a procedure similar to that described above, molding is performed on the mold B, and the mold A is transferred to the vulcanizer and replaced with a new mold.

In this manner, a single hydraulic cylinder 8 is capable of simultaneously raising and tilting the molds on the right-hand and left-hand sides, and the exchange of the molds between the right-hand and left-hand positions is effected with a small rotational space.

In the aforementioned embodiment, the purpose is to simplify the construction and make the machine smaller by effecting the raising and tilting of the molds A and B supported by the supporting machines 6 on the right-hand and left-hand sides with the single hydraulic cylinder 8, via the linkage 7 and 7a. The invention, however, is not limited to the illustrated structure. For instance, the pivoting of each supporting machine 6 for raising or tilting a mold may be made independently of each other, by means of separate drive units. In this case, when the rotary table 3 is to be turned to exchange the positions of the molds, the space required for the rotation of the molds may be reduced further than that of the molding machine of the aforementioned embodiment by raising all molds to vertical positions. Moreover, the number of supporting machines 6 to be mounted on the rotary table 3 may be increased to three or more. Furthermore, the units for driving the rotary table 3, supporting machines 6, etc. are not limited to hydraulic cylinders. Hydraulic motors, electric motors, etc. may be used.

As will be clear from the foregoing description, the present invention has the following advantages or effects:

(1) The overall configuration of the machine is simple and allows a more compact construction, and the installation space and the operating radius can be reduced. Since molding and exchange of mold operations may be made at the same time, there is no need to halt the production line during the exchange of molds, and thus the production efficiency is high. Moreover, as the exchange of molds is made with the molds being raised vertically, the work is easier and safer.

(2) The mechanism for pivoting the molds is simplified further in configuration, and is advanced further in compact construction. Moreover, since the raising and tilting actions of the molds on the right-hand and left-hand sides are made simultaneously, the operation is simpler and the working efficiency is also improved. The production cost is also reduced significantly.

What is claimed is:

1. A molding machine for rubber belt production wherein canvas, cords, rubber sheet, etc. are wound over a mold to form a molding, said molding machine comprising a plurality of supporting machines each adapted to support a mold disconnectably and rotatably around the central axis of said mold, a rotary table rotatable on a vertical center of rotation, said supporting machines being mounted on said rotary table at a fixed radial distance from said center of rotation of said rotary table, each supporting machine being pivotably supported for tilting a mold between a position wherein the central axis of the mold is substantially horizontal and a position wherein the central axis is substantially vertical, a pair of supporting stands mounted on said rotary table opposingly with each other across said center of rotation of the table, each supporting machine being pivotally mounted on a horizontal support shaft of each of said support stands, one end of a linkage member fixed to each support shaft, and two ends of a connecting link rotatably connected to the other ends of the linkage members respectively in such a way that when a mold supported by one supporting machine is substantially horizontal, a mold supported by the other supporting machine is substantially vertical, and
a single cylinder unit connected to reciprocate said connecting link in the axial direction thereof.

2. A molding machine as set forth in claim 1, wherein said single cylinder unit and said connecting link hold all of said molds at an oblique angle between said horizontal position and said vertical position during the time that said rotary table is being rotated.

* * * * *